(12) United States Patent
Blush

(10) Patent No.: US 7,674,997 B2
(45) Date of Patent: Mar. 9, 2010

(54) SPINNER FOR FIBERIZING GLASS AND METHOD

(75) Inventor: Jason J. Blush, Lakewood, CO (US)

(73) Assignee: Johns Manville, Denver, CO (US)

( * ) Notice: Subject to any disclaimer, the term of this patent is extended or adjusted under 35 U.S.C. 154(b) by 734 days.

(21) Appl. No.: 11/582,261

(22) Filed: Oct. 17, 2006

(65) Prior Publication Data

US 2008/0184744 A1    Aug. 7, 2008

(51) Int. Cl.
*B23K 15/08* (2006.01)
*C03B 37/04* (2006.01)

(52) U.S. Cl. .................. 219/121.15; 219/121.18; 219/121.2; 219/121.35; 219/121.71; 65/521

(58) Field of Classification Search ............ 219/121.15, 219/121.18, 121.2, 121.35, 121.7, 121.71; 65/459, 470, 521; 264/8, 211.1, 211.11, 264/311
See application file for complete search history.

(56) References Cited

U.S. PATENT DOCUMENTS

| | | | |
|---|---|---|---|
| 3,562,009 A * | 2/1971 | Cranston et al. ............ 427/597 |
| 3,632,398 A * | 1/1972 | Konig ........................ 427/582 |
| 4,066,864 A * | 1/1978 | Heitmann .............. 219/121.14 |
| 4,378,481 A | 3/1983 | Brennan et al. |
| 4,386,257 A | 5/1983 | Brennan et al. |
| 4,404,009 A * | 9/1983 | Bhatti et al. ................. 65/475 |
| 4,411,730 A | 10/1983 | Fishter et al. |
| 4,470,945 A | 9/1984 | Howard et al. |
| 4,511,383 A * | 4/1985 | Bhatti ........................ 65/457 |
| 4,668,265 A * | 5/1987 | Gaul et al. .................... 65/457 |
| 4,808,097 A * | 2/1989 | Takahashi et al. .............. 425/8 |
| 4,948,409 A * | 8/1990 | Chenoweth et al. ........... 65/515 |
| 4,978,639 A * | 12/1990 | Hua et al. .................... 438/465 |
| 5,731,047 A * | 3/1998 | Noddin ........................ 427/555 |
| 5,846,284 A * | 12/1998 | Hinze et al. ................... 65/492 |
| 5,914,439 A | 6/1999 | McGarry |
| 6,361,836 B1 * | 3/2002 | Johnson ...................... 427/534 |
| 6,671,951 B2 * | 1/2004 | Nishii et al. .................. 29/852 |

* cited by examiner

*Primary Examiner*—Samuel M Heinrich
(74) *Attorney, Agent, or Firm*—Robert D. Touslee

(57) ABSTRACT

A spinner for fiberizing glass has fiberizing holes formed in the spinner sidewall by a process utilizing an electron beam perforating process. A backing material used in the process is deposited on the walls of the fiberizing holes for increasing the corrosion resistance of the fiberizing holes. With regard to the formation of each fiberizing hole, an interaction of the backing material with an electron beam during the electron beam perforating process creates a gaseous backing material that expands through a hole created by the electron beam in the spinner sidewall to eject molten alloy material of the spinner sidewall made molten by the electron beam from the hole and deposit a thin substantially uniform coating layer of the backing material on the wall of the hole to increase the corrosion resistance of the fiberizing hole thus formed.

5 Claims, 1 Drawing Sheet

SPINNER FOR FIBERIZING GLASS AND METHOD

BACKGROUND OF THE INVENTION

The subject invention relates to a method of making a spinner for fiberizing glass; to the spinner made by the method; and more particularly, to a method of forming fiberizing holes in the spinner sidewall by a process utilizing an electron beam perforating process wherein a backing material used in the process is deposited on the walls of the fiberizing holes to increase the corrosion resistance of the fiberizing holes and the service life of the spinner.

High temperature rotary glass fiberization processes fiberize molten glass by using centrifugal forces to pass the molten glass through rows of small diameter fiberizing holes in the annular peripheral sidewalls of spinners. These spinners, which typically have from several hundred fiberizing holes to tens of thousands of fiberizing holes in the spinner sidewall, are typically operated in a high temperature oxidizing environment (e.g. an oxidizing environment having temperatures of 1600° F. and greater) and at rotational speeds of over a thousand revolutions per minute (e.g. rotational speeds of 1500 revolutions per minute and greater). In this high temperature oxidizing environment and at these high rotational speeds, the corrosive effects of glass on the spinner alloy forming the walls of the fiberizing holes in the spinner sidewall causes the fiberizing holes to enlarge in diameter. This enlargement of the fiberizing holes eventually results in loss of fiber diameter and/or length control whereby a portion of the fibers produced will be too large or too small in diameter, to long or short in length, and/or the fiber diameter distribution of the fibers produced by the spinner will no longer meet product specifications and the spinner must be taken out of service.

Currently, the fiberizing holes in spinners used for producing glass fibers in the glass fiber industry are created by electron beam perforating processes and laser perforating processes. An electron beam perforating process utilizes a backing material on the reverse side of the spinner sidewall being drilled that produces large volumes of gaseous material through an interaction between the backing material and an electron beam of the electron beam perforating process. With regard to the formation of each fiberizing hole in a spinner sidewall by an electron beam perforating process, the gaseous material created by the interaction between the backing material and an electron beam of the process expands through the hole in the spinner sidewall created by the electron beam and ejects molten material of the sidewall, created by an interaction between the electron beam and the sidewall, from the hole to form a fiberizing hole. Often a thin layer of the backing material is deposited on the wall of the fiberizing hole thus formed. Current backing materials used in electron beam perforating processes are often made of copper, zinc, and other materials that adversely affect the corrosion resistance of the fiberizing holes formed by the process. These materials can lead to the formation of low temperature eutectics in the wall of the fiberizing hole produced by the process, which lower the melting point of the spinner sidewall material forming the wall of the fiberizing hole, and thereby adversely affect the corrosion resistance of the wall of the fiberizing hole. Thus, increasing the corrosion resistance of the fiberizing holes produced by electron beam perforating processes to molten glass in a high temperature oxidizing environment where the spinners are being operated at high rotational speeds to prolong the service life of these spinners is very desirable.

SUMMARY OF THE INVENTION

In the method of the subject invention, a spinner for fiberizing glass has cylindrical or substantially cylindrical shaped fiberizing holes formed in the spinner sidewall by an electron beam perforating process. A backing material used in the process is deposited on the walls of the fiberizing holes to increase the corrosion resistance of the fiberizing holes, which typically have a diameter between about 0.01 and about 0.1 inches and a length between about 0.1 and about 0.5 inches.

The backing material composition is selected to be compatible with the alloy material of the spinner sidewall and to increase the corrosion resistance of fiberizing holes formed in the spinner sidewall by the electron beam perforating process when, in service, the spinner is subjected to the corrosive effects of glass in a high temperature oxidizing environment (e.g. an oxidizing environment having temperatures of 1600° F. and greater) while being rotated at high rotational speeds (e.g. speeds of 1500 revolutions per minute and greater). Preferably, the backing material has a coefficient of thermal expansion substantially the same as that of the alloy material of the spinner sidewall. In addition, the backing material for the process is selected to provide, for the thermal reaction produced by the interaction of an electron beam of electron beam perforating process and the backing material during the perforating process and the position of the backing material relative to the spinner sidewall, at least the minimum amount of gaseous backing material required at the vapor pressure required to eject molten material of the spinner sidewall, made by an interaction between the electron beam and the sidewall, from a hole in the sidewall made by the electron beam and deposit a thin coating layer of the backing material on the wall of the fiberizing hole thus formed in the sidewall.

With regard to the formation of each fiberizing hole, the thermal reaction produced by the interaction of the backing material with an electron beam during the electron beam perforating process creates a gaseous backing material that expands through a hole created by the electron beam in the spinner sidewall to eject molten alloy material of the spinner sidewall made molten by the electron beam from the hole and deposit a thin substantially uniform coating layer of the backing material on the wall of the fiberizing hole thus created to increase the corrosion resistance of the fiberizing hole. The diameter of such fiberizing holes is typically between about 0.01 and about 0.1 inches and the length of such fiberizing holes is typically between about 0.1 and about 0.5 inches. The coating layer of backing material can be subsequently heat treated, prior to placing the spinner in service, to complete the formation of or increase the corrosion resistance of the backing material coating layer on the wall of the fiberizing hole.

DETAILED DESCRIPTION OF THE INVENTION

In the process of the subject invention a spinner for fiberizing glass has fiberizing holes formed in the spinner sidewall by an electron beam perforating process. In the process, a backing material used in the process is also deposited on the walls of the fiberizing holes for increasing the corrosion resistance of fiberizing holes.

Figure 1:
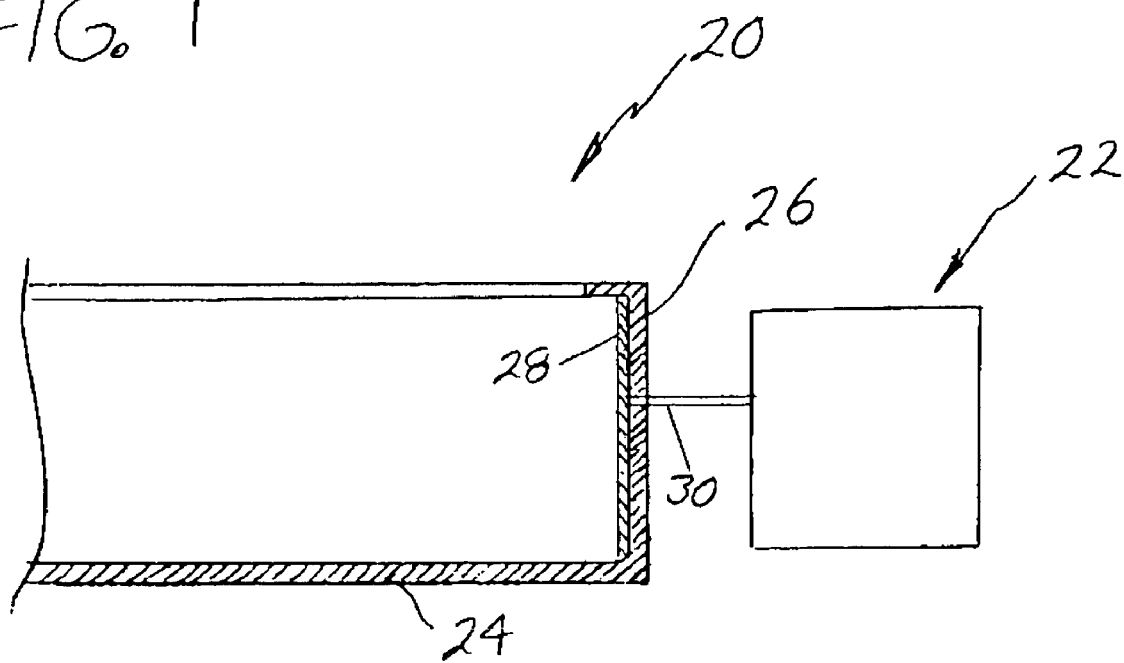
FIG. 1 is a fragmentary vertical transverse cross section through a spinner schematically illustrating a fiberizing hole being formed in a peripheral sidewall of the spinner with electron beam perforating equipment in accordance with the method of the subject invention.
Figure 2:
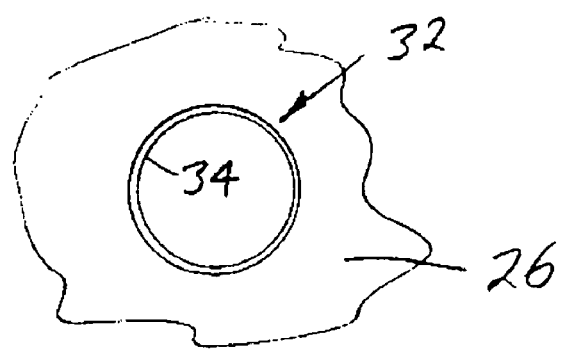
FIG. 2 is a greatly enlarged schematic, fragmentary view of a spinner sidewall showing a fiberizing hole made by the method of the subject invention that is coated with a substantially uniform thin metallic coating layer of backing material.

As schematically shown in FIG. 1, a plurality of fiberizing holes for fiberizing glass are being simultaneously formed in a spinner 20 with electron beam perforating equipment 22 in accordance with the method of the subject invention. The spinner has a disc shaped base 24 and an annular peripheral sidewall 26 of a high temperature resistant alloy material. The annular peripheral sidewall 26 of the spinner 20 extends upward from an outer edge portion of the disc shaped base 24 of the spinner. A spinner for fiberizing glass typically has between several hundred fiberizing holes and tens of thousands of fiberizing holes, which typically have diameters between about 0.01 and about 0.1 inches and lengths between about 0.1 and about 0.5 inches. In service, the spinner 20 is rotated at high rotational speeds (e.g. speeds of 1500 revolutions per minute and greater) in a high temperature oxidizing environment (e.g. an oxidizing environment having temperatures of 1600° F. and greater) to extrude glass through the fiberizing holes and fiberize the glass. While spinners of other high temperature resistant alloys are used to fiberize glass, U.S. Pat. No. 6,823,698 B2, issued Nov. 30, 2004, which discloses a spinner made of intermetallic compounds of aluminides of nickel ($Ni_3Al$ and $NiAl$), is an example of a spinner utilized to fiberize glass and the disclosure of the U.S. Pat. No. 6,823,698 B2 patent is hereby incorporated herein by reference in its entirety.

The electron beam perforating equipment 22 utilized in the electron beam perforating process of the subject invention can be conventional electron beam perforating equipment. While the electron beam perforating equipment 22, shown in FIG. 1, utilizes only one electron beam 30, electron beam perforating equipment can be utilized that simultaneously emits two or more electron beams.

The backing material 28 has a composition selected to increase the corrosion resistance of fiberizing holes 32 formed in the spinner sidewall 26 by the electron beam perforating process during the service life of the spinner when the spinner is subjected to the corrosive effects of glass in a high temperature oxidizing environment (e.g. an oxidizing environment having temperatures of 1600° F. and greater) while being rotated at high rotational speeds (e.g. speeds of 1500 revolutions per minute and greater). Preferably, the backing material 28 has a coefficient of thermal expansion the same as or substantially the same as that of the alloy material of the spinner sidewall 26 and is otherwise compatible with the alloy material of the spinner sidewall. In addition, the backing material 28 for the process is selected to provide, for the thermal reaction produced by the interaction of an electron beam 30 of electron beam perforating process and backing material 28 during the perforating process and the position of the backing material 28 relative to the spinner sidewall 26, at least the minimum amount of gaseous backing material required at the vapor pressure required to eject molten material of the spinner sidewall 26 made by the electron beam 30 from a hole in the sidewall made by the electron beam 30 and deposit a thin coating layer 34 of the backing material 28 on the wall of the fiberizing hole thus formed in the spinner sidewall.

As shown in FIG. 1, the backing material 28 is preferably located against or immediately adjacent the inner surface of the spinner sidewall 26 so that when the gaseous backing material is formed by the process through the vaporization of the backing material 28 by the interaction of the backing material with an electron beam 30, the gaseous backing material is confined to an extent sufficient for the gaseous backing material to exert sufficient pressure to eject molten material from a hole formed in the spinner sidewall 26 by the electron beam 30 and is present in sufficient amounts to form a deposit of a thin substantially uniform coating layer 34 of the backing material 28 on the surface of the fiberizing hole 32 thus formed to increase the corrosion resistance of the fiberizing hole. With regard to the formation of each fiberizing hole 32, the gaseous backing material created by the interaction of the backing material 28 with an electron beam 30 during the electron beam perforating process expands through the hole created by the electron beam 30 in the spinner sidewall 26 to eject molten alloy material of the spinner sidewall made molten by the electron beam 30 from the hole and deposit a thin substantially uniform coating layer 34 of the backing material 28 on the wall of the fiberizing hole 32 thus formed to increase its corrosion resistance.

The thin coating layer 34 of backing material 28 deposited on the wall of the fiberizing hole 32 can be subsequently heat treated prior to placing the spinner 20 in service to increase adhesion between the thin coating layer 34 of backing material 28 and the wall of the fiberizing hole 32. The thin coating layer 34 of backing material 28 deposited on the wall of the fiberizing hole 32 can be subsequently heat treated prior to placing the spinner 20 in service to transform the backing material 28 of the thin coating layer 34 into a material with enhanced corrosion resistance when compared to the backing material 28 prior to the heat treatment. The thin coating layer 34 of backing material 28 deposited on the wall of the fiberizing hole 32 can be subsequently heat treated prior to placing the spinner 20 in service to both increase adhesion between the thin coating layer 34 and the wall of the fiberizing hole 32 and transform the backing material 28 of the thin coating layer 34 into a material with enhanced corrosion resistance when compared to the backing material 28 prior to the heat treatment.

It is contemplated that the backing material 28 for forming the thin metallic coating layer 34 on the fiberizing holes 32 can be an alloy or simple element and includes but is not limited to metallic materials such as platinum group metals and alloys thereof; and chromium, nickel, cobalt, and aluminum and alloys thereof (such as alloys containing one or more of chromium, nickel, cobalt, and aluminum). For example, it is contemplated that alloys could be used containing copper and zinc and one or more of chromium, nickel, cobalt and aluminum provided these alloys produce a sufficient volume of gaseous backing material by the interaction of the backing material with the electron beam to: a) eject molten alloy material (made molten by the electron beam) from a perforation formed by the electron beam in the spinner sidewall from the perforation, and b) deposit a thin substantially uniform coating layer of the backing material on the wall of the hole thus created in the sidewall to increase the corrosion resistance of the hole).

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of forming fiberizing holes for fiberizing glass in an annular peripheral sidewall of a spinner wherein the sidewall extends upward from an outer edge portion of a disc shaped base of the spinner and wherein, in service, the spinner is rotated at high rotational speeds in a high temperature environment to extrude glass through the fiberizing holes and fiberize the glass, comprising:

providing a spinner with a disc shaped base and an annular peripheral sidewall of an alloy material;

providing a backing material for use as a backing layer for an electron beam perforating process and for increasing the corrosion resistance of fiberizing holes to be formed in the spinner sidewall by an electron beam perforating process by being deposited on walls of the fiberizing holes formed by the process; the backing material having a coefficient of thermal expansion substantially the same as that of the alloy material of the spinner sidewall; and forming a plurality of fiberizing holes in the spinner sidewall by means of an electron beam perforating process that utilizes the backing material on a side of the spinner sidewall opposite that from which electron beams are directed onto the spinner sidewall wherein, for each of the plurality of fiberizing holes:

an interaction of the backing material with the electron beam during the electron beam perforating process creates a gaseous backing material, and the backing material is positioned relative to the spinner sidewall so that a sufficient volume of gaseous backing material produced by the interaction of the backing material with the electron beam expands through a hole created by the electron beam in the spinner sidewall to eject molten alloy material of the spinner sidewall made molten by the electron beam from the hole and deposit a thin substantially uniform coating layer of the backing material on a substantially cylindrical shaped wall of the hole.

2. The method of forming fiberizing holes for fiberizing glass in an annular peripheral sidewall of a spinner according to claim 1, wherein:

the thin coating layer of backing material deposited on the wall of the hole is subsequently heat treated, prior to placing the spinner in service, to increase adhesion between the thin coating layer of backing material and the wall of the hole.

3. The method of forming fiberizing holes for fiberizing glass in an annular peripheral sidewall of a spinner according to claim 2, wherein:

the heat treatment transforms the backing material of the thin coating layer deposited on the wall of the hole into a material with enhanced corrosion resistance when compared to the backing material prior to the heat treatment.

4. The method of forming fiberizing holes for fiberizing glass in an annular peripheral sidewall of a spinner according to claim 1, wherein:

the thin coating layer of backing material deposited on the wall of the hole is subsequently heat treated, prior to placing the spinner in service, to transform the backing material of the thin coating layer deposited on the wall of the hole into a material with enhanced corrosion resistance when compared to the backing material prior to the heat treatment.

5. The method of forming fiberizing holes for fiberizing glass in an annular peripheral sidewall of a spinner according to claim 1, wherein:

the backing material is selected from a group consisting of platinum group metals and alloys thereof; and chromium, nickel, cobalt, and/or aluminum and alloys thereof.

* * * * *